US012730525B2

(12) United States Patent
Okutomi

(10) Patent No.: US 12,730,525 B2
(45) Date of Patent: Sep. 8, 2026

(54) SENSOR AND ELECTRONIC DEVICE

(71) Applicant: Murata Manufacturing Co., Ltd., Nagaokakyo (JP)

(72) Inventor: Yoshihito Okutomi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 19/194,384

(22) Filed: Apr. 30, 2025

(65) Prior Publication Data

US 2025/0271952 A1 Aug. 28, 2025

Related U.S. Application Data

(63) Continuation of application No. PCT/JP2023/038799, filed on Oct. 27, 2023.

(30) Foreign Application Priority Data

Nov. 10, 2022 (JP) ................................ 2022-180001

(51) Int. Cl.
*G06F 3/0354* (2013.01)
*G06F 3/044* (2006.01)

(52) U.S. Cl.
CPC ........ *G06F 3/03547* (2013.01); *G06F 3/0447* (2019.05); *G06F 2203/04102* (2013.01)

(58) Field of Classification Search
CPC ............... G06F 3/03547; G06F 3/0447; G06F 2203/04102
See application file for complete search history.

(56) References Cited

U.S. PATENT DOCUMENTS 10,627,929 B2 4/2020 Kano et al.
2011/0025631 A1* 2/2011 Han ..................... G06F 3/0445 345/173
2017/0160872 A1* 6/2017 Mori ..................... G06F 3/0446
2017/0192550 A1 7/2017 Kano et al.

FOREIGN PATENT DOCUMENTS

JP 2012174103 A * 9/2012
JP 2014-229029 A 12/2014
JP 2015-207092 A 11/2015
WO 2016/027603 A1 2/2016

OTHER PUBLICATIONS

International Search Report received for PCT Patent Application No. PCT/JP2023/038799, mailed on Dec. 5, 2023, 2 pages (English Translation Only).

* cited by examiner

*Primary Examiner* — Robert J Michaud
(74) *Attorney, Agent, or Firm* — ArentFox Schiff LLP

(57) ABSTRACT

A sensor that includes: a holding member having a first main surface and a second main surface arranged in a first direction and having a rectangular shape as viewed from the first direction; a deformation detection sensor constructed to output a signal when the holding member is deformed; and a plurality of first fixing portions fixed to the second main surface and overlapping corner portions of the holding member as viewed from the first direction, and the plurality of first fixing portions are separated from each other.

16 Claims, 12 Drawing Sheets

Fig. 9

SENSOR AND ELECTRONIC DEVICE

CROSS REFERENCE TO RELATED APPLICATIONS

The present application is a continuation of International application No. PCT/JP2023/038799, filed Oct. 27, 2023, which claims priority to Japanese Patent Application No. 2022-180001, filed Nov. 10, 2022, the entire contents of each of which are incorporated herein by reference.

TECHNICAL FIELD

The present disclosure relates to a sensor and an electronic device including a deformation detection sensor which detects deformation of a member.

BACKGROUND ART

Patent Document 1 describes a terminal that detects a load applied by a user. The terminal includes a housing, a holding member, and a piezoelectric sensor. The entire outer peripheral edge portion of the holding member is fixed to the housing with an adhesive. The piezoelectric sensor is provided on the holding member. The piezoelectric sensor outputs a signal according to deformation of the holding member.

Patent Document 1: PCT International Publication No. 2016/027603

SUMMARY OF THE DISCLOSURE

In a field of the terminal described in Patent Document 1, a sensor is desired in which a deformation detection sensor which detects deformation of a member easily detects the deformation of the member.

An object of the present disclosure is to provide a sensor in which a deformation detection sensor which detects deformation of a member easily detects the deformation of the member.

A sensor according to an embodiment of the present disclosure includes: a holding member having a first main surface and a second main surface arranged in a first direction and having a rectangular shape as viewed from the first direction; a deformation detection sensor constructed to output a signal when the holding member is deformed; and a plurality of first fixing portions fixed to the second main surface and overlapping corner portions of the holding member as viewed from the first direction, and the plurality of first fixing portions are separated from each other.

According to the sensor according to the embodiment of the present disclosure, the deformation detection sensor which detects deformation of a member easily detects the deformation of the member.

BRIEF EXPLANATION OF THE DRAWINGS

FIG. 9 is a view illustrating a sensor 1*e* according to a fifth modification.

DETAILED DESCRIPTION

First Embodiment

Figure 1:
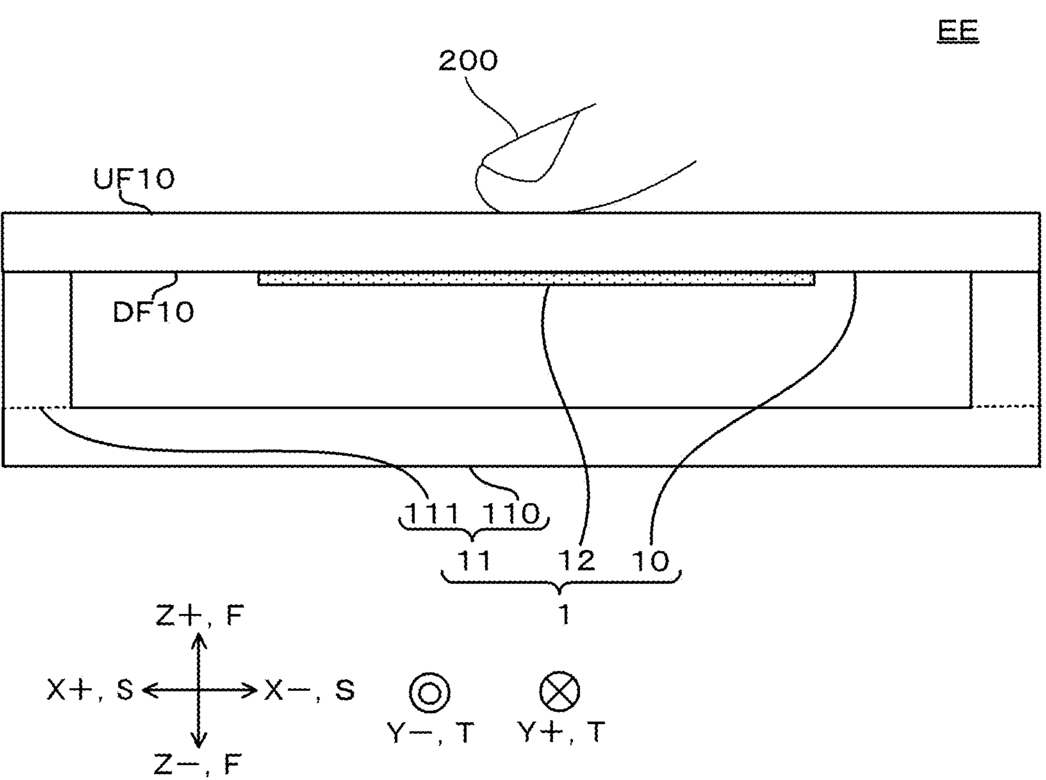
FIG. 1 is a sectional view illustrating an electronic device EE including a sensor 1 according to a first embodiment.
Figure 2:
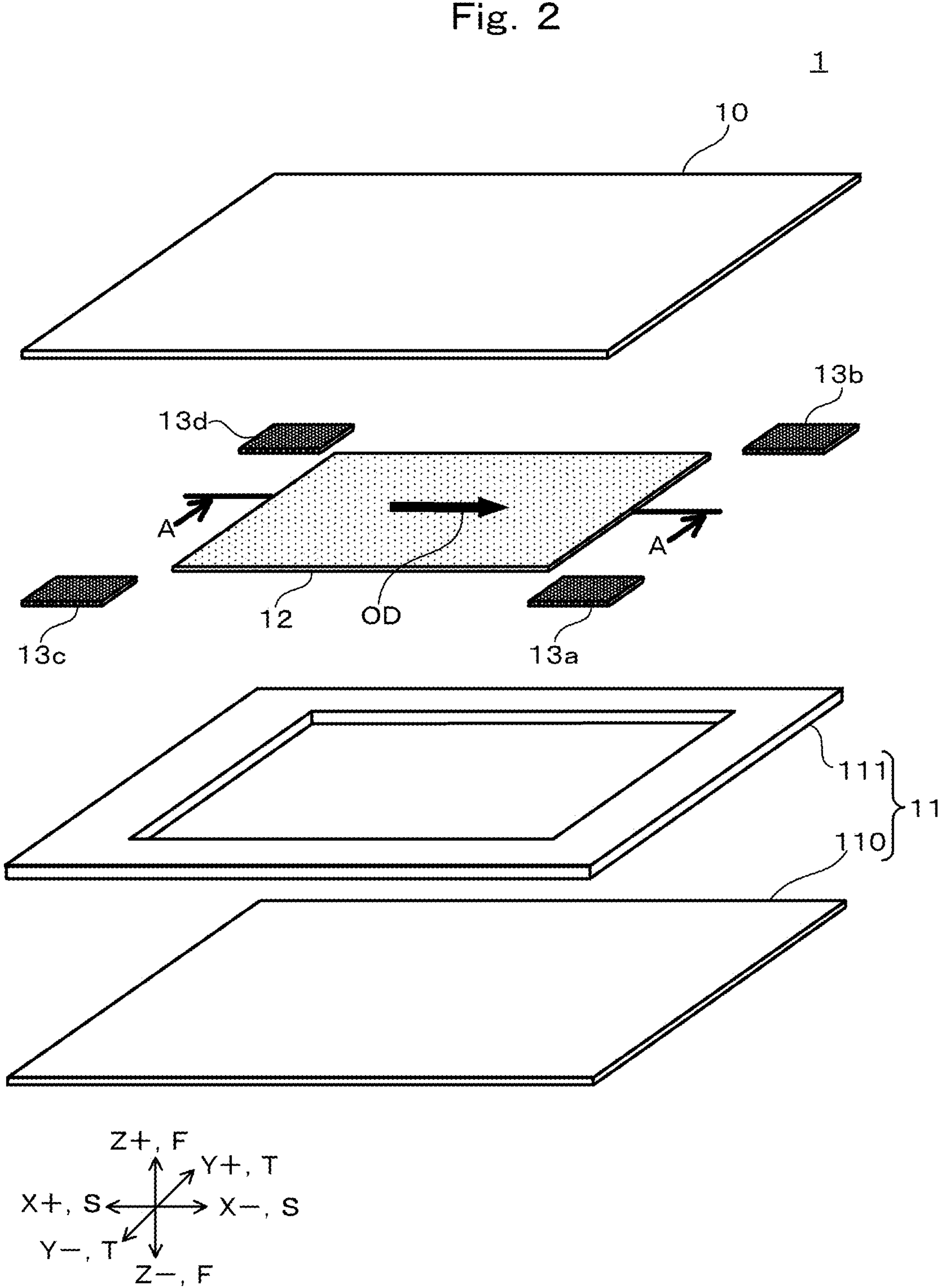
FIG. 2 is an exploded perspective view of the sensor 1.
Figure 3:
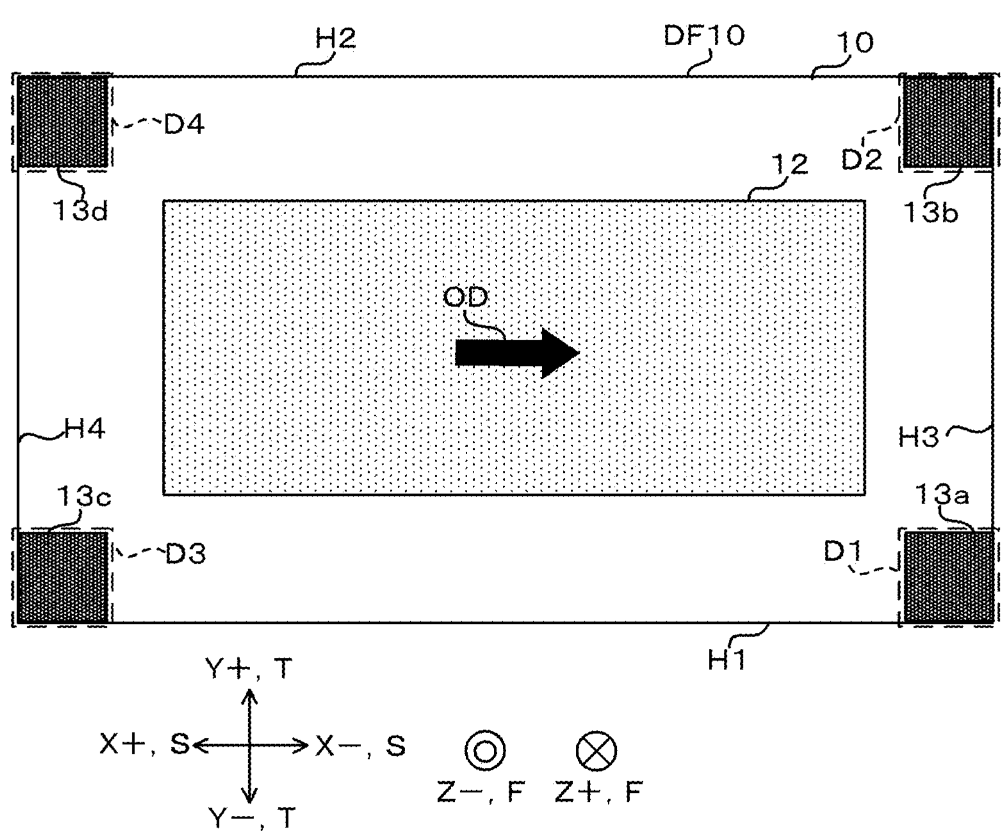
FIG. 3 is a view of the sensor 1 as viewed in a positive direction of a Z axis.
Figure 4:
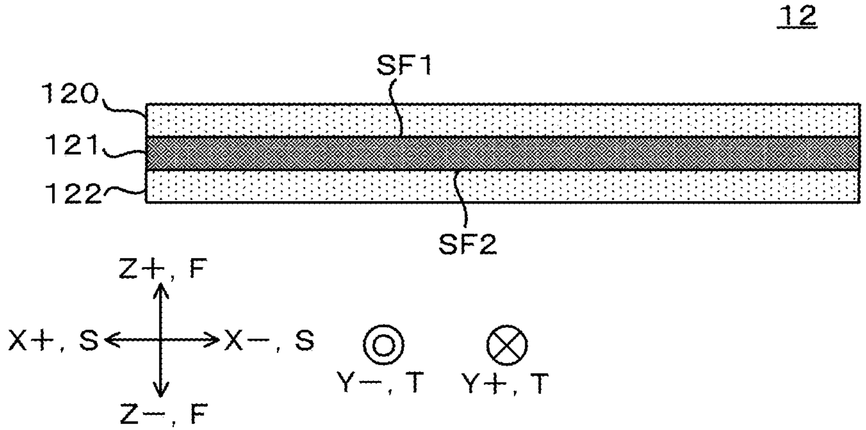
FIG. 4 is a sectional view taken along line A-A in FIG. 2.

Hereinafter, a sensor 1 according to a first embodiment of the present disclosure will be described with reference to the drawings. FIG. 1 is a sectional view illustrating an electronic device EE including the sensor 1 according to the first embodiment. FIG. 2 is an exploded perspective view of the sensor 1. FIG. 3 is a view of the sensor 1 as viewed in a positive direction of a Z axis. FIG. 4 is a sectional view taken along line A-A in FIG. 2.

In the present embodiment, directions are defined as follows. As illustrated in FIGS. 1 and 2, a Z axis direction is a direction in which a holding member 10 and a deformation detection sensor 12 are arranged. A negative direction of the Z axis is a direction in which the holding member 10 and the deformation detection sensor 12 are arranged in this order. The positive direction of the Z axis is a direction in which the deformation detection sensor 12 and the holding member 10 are arranged in this order. An X axis direction is a direction orthogonal to the Z axis. A Y axis direction is a direction orthogonal to the Z axis direction and the X axis direction. In the present embodiment, a first direction F coincides with the Z axis direction. In the present embodiment, a second direction S coincides with the X axis direction. In the present embodiment, a third direction T coincides with the Y axis direction.

Hereinafter, M is a component or a member of the sensor 1. In the present specification, each part of M is defined as follows unless otherwise specified. An end portion of M in a positive direction of the X axis means an end of M in the positive direction of the X axis and the vicinity thereof. An end portion of M in a negative direction of the X axis means an end of M in the negative direction of the X axis and the vicinity thereof. An end portion of M in a positive direction of the Y axis means an end of M in the positive direction of the Y axis and the vicinity thereof. An end portion of M in a negative direction of the Y axis means an end of M in the negative direction of the Y axis and the vicinity thereof. An end portion of M in the positive direction of the Z axis means an end of M in the positive direction of the Z axis and the vicinity thereof. An end portion of M in the negative direction of the Z axis means an end of M in the negative direction of the Z axis and the vicinity thereof.

As illustrated in FIG. 1, the sensor 1 is, for example, a module provided in the electronic device EE such as a smartphone. As illustrated in FIG. 2, the sensor 1 includes the holding member 10, a housing 11, the deformation detection sensor 12, and a plurality of first fixing portions. In the present embodiment, the sensor 1 includes four first fixing portions 13*a*, 13*b*, 13*c*, and 13*d*.

The holding member 10 is, for example, a member having an electronic component such as a circuit board. As illustrated in FIGS. 1 to 3, the holding member 10 has a rectangular shape as viewed from the first direction F. The holding member 10 has a rectangular shape which has two long sides extending in the second direction S and two short sides extending in the third direction T. Specifically, as illustrated in FIG. 3, the holding member 10 has a first side H1 and a second side H2 extending along the X axis. Each of the first side H1 and the second side H2 is one of two long sides of the holding member 10. The first side H1 and the second side H2 are arranged in this order in the positive direction of the Y axis. The holding member 10 has a third side H3 and a fourth side H4 extending along the Y axis. Each of the third side H3 and the fourth side H4 is one of two short sides of the holding member 10. The third side H3 and the fourth side H4 are arranged in this order in the positive direction of the X axis.

As illustrated in FIGS. 2 and 3, the holding member 10 has a rectangular shape having four corner portions. Specifically, the holding member 10 has a first corner portion D1 formed by the first side H1 and the third side H3. The first corner portion D1 includes a corner formed by the first side H1 and the third side H3 and a vicinity thereof. The holding member 10 has a second corner portion D2 formed by the second side H2 and the third side H3. The second corner portion D2 includes a corner formed by the second side H2 and the third side H3 and a vicinity thereof. The holding member 10 has a third corner portion D3 formed by the first side H1 and the fourth side H4. The third corner portion D3 includes a corner formed by the first side H1 and the fourth side H4 and a vicinity thereof. The holding member 10 has a fourth corner portion D4 formed by the second side H2 and the fourth side H4. The fourth corner portion D4 includes a corner formed by the second side H2 and the fourth side H4 and a vicinity thereof.

As illustrated in FIG. 1, the holding member 10 includes a first main surface UF10 and a second main surface DF10 arranged in the first direction F. The first main surface UF10 and the second main surface DF10 are arranged in this order in the negative direction of the Z axis. The holding member 10 has elasticity. The holding member 10 is deformed by a force applied to the holding member 10. For example, as illustrated in FIG. 1, a user 200 presses the holding member 10 in the negative direction of the Z axis. The holding member 10 is deformed by the force which is applied to the holding member 10 in the negative direction of the Z axis, so as to protrude in the negative direction of the Z axis.

The housing 11 is formed of, for example, resin. For example, the housing 11 includes a plate-shaped portion 110 and a frame-shaped portion 111 as an example (see FIGS. 1 and 2). The plate-shaped portion 110 and the frame-shaped portion 111 are arranged in this order in the positive direction of the Z axis. The plate-shaped portion 110 has a plate shape which has two sides extending along the X axis and two sides extending along the Y axis. The frame-shaped portion 111 is in contact with the plate-shaped portion 110. The frame-shaped portion 111 has an annular shape as viewed in the Z axis direction. A vicinity of a center of the plate-shaped portion 110 in the X axis direction and the Y axis direction is not in contact with the frame-shaped portion 111.

As illustrated in FIGS. 2 and 3, the deformation detection sensor 12 has a rectangular shape which has a long side extending along the X axis and a short side extending along the Y axis. As illustrated in FIG. 4, the deformation detection sensor 12 includes a piezoelectric film 121, a first electrode 120, a second electrode 122, and a detection circuit (not illustrated). The first electrode 120, the piezoelectric film 121, and the second electrode 122 are arranged in this order in the negative direction of the Z axis.

As illustrated in FIGS. 2 and 3, the piezoelectric film 121 has a rectangular shape which has a long side extending along the X axis and a short side extending along the Y axis. As illustrated in FIG. 4, the piezoelectric film 121 has a first main surface SF1 and a second main surface SF2 arranged in the Z axis direction.

The piezoelectric film 121 generates a charge according to a deformation amount of the piezoelectric film 121. For example, a polarity of the charge generated when the piezoelectric film 121 is stretched in the negative direction of the X axis and the positive direction of the Y axis is different from a polarity of the charge generated when the piezoelectric film 121 is stretched in the negative direction of the X axis and the negative direction of the Y axis or a polarity of the charge generated when the piezoelectric film 121 is stretched in the positive direction of the X axis and the positive direction of the Y axis. Specifically, the piezoelectric film 121 is a film formed of a chiral polymer. The chiral polymer is, for example, polylactic acid (PLA), particularly poly-L-lactic acid (PLLA). A main chain of the PLLA has a helical structure. The PLLA has piezoelectricity in which molecules are oriented when uniaxial stretching is performed. The piezoelectric film 121 has a piezoelectric constant of d14. As illustrated in FIGS. 2 and 3, a uniaxial stretching direction OD of the piezoelectric film 121 forms an angle of 0 degrees or 180 degrees with respect to the X axis direction. The 0 degrees include, for example, an angle including about 0 degrees±10 degrees. The 180 degrees include, for example, an angle including about 180 degrees±10 degrees. As a result, the piezoelectric film 121 generates a charge when the piezoelectric film 121 is stretched in the positive direction of the X axis and the positive direction of the Y axis, the positive direction of the X axis and the negative direction of the Y axis, the negative direction of the X axis and the positive direction of the Y axis, or the negative direction of the X axis and the negative direction of the Y axis. For example, the piezoelectric film 121 generates a positive charge when the piezoelectric film 121 is stretched in the negative direction of the X axis and the positive direction of the Y axis. For example, the piezoelectric film 121 generates a negative charge when the piezoelectric film 121 is stretched in the negative direction of the X axis and the negative direction of the Y axis. A magnitude of the charge depends on a differential value of the deformation amount of the piezoelectric film 121 due to stretching or compression.

In the present embodiment, the first electrode 120 is a reference electrode connected to a reference potential. The first electrode 120 is fixed to the first main surface SF1 by an adhesive (not illustrated) such as OCA. The first electrode 120 covers the first main surface SF1.

In the present embodiment, the second electrode 122 is a signal electrode. The second electrode 122 is fixed to the second main surface SF2 by an adhesive (not illustrated) such as OCA. The second electrode 122 covers the second main surface SF2.

The detection circuit includes a charge amplifier (not illustrated), an AD converter (not illustrated), and the like. The charge amplifier converts the charge generated by the piezoelectric film 121 into a voltage signal. The AD converter AD-converts the voltage signal to generate a digital signal.

The deformation detection sensor 12 outputs a signal corresponding to deformation of the holding member 10. As illustrated in FIGS. 1 to 3, the deformation detection sensor 12 is fixed to the holding member 10 by an adhesive (not illustrated) such as OCA. As a result, the deformation detection sensor 12 is deformed along with the deformation of the holding member 10. The deformation detection sensor 12 outputs a signal corresponding to the deformation of the deformation detection sensor 12.

As illustrated in FIGS. 2 and 3, the first fixing portion 13*a* has a rectangular shape which has two sides extending along the X axis and two sides extending along the Y axis. In the Z axis direction, the first fixing portion 13*a* is located between the holding member 10 and the housing 11. The first fixing portion 13*a* is in contact with the second main surface DF10. The first fixing portion 13*a* is in contact with the frame-shaped portion 111 of the housing 11. The first fixing portion 13*a* is, for example, a double-sided tape. As a result, the first fixing portion 13*a* is fixed to the second main surface DF10. The first fixing portion 13*a* is fixed to the housing 11.

The first fixing portion 13*a* is arranged at the first corner portion D1. The first fixing portion 13*a* overlaps the first corner portion D1 as viewed from the first direction F. In the present embodiment, as illustrated in FIG. 3, an end of the first fixing portion 13*a* in the negative direction of the X axis overlaps the third side H3 as viewed in the Z axis direction. An end of the first fixing portion 13*a* in the negative direction of the Y axis overlaps the first side H1 as viewed in the Z axis direction. The first fixing portion 13*a* does not overlap the deformation detection sensor 12 as viewed in the Z axis direction. The first fixing portion 13*a* is not in contact with the deformation detection sensor 12. The first fixing portion 13*a* is separated from the first fixing portion 13*b*, the first fixing portion 13*c*, and the first fixing portion 13*d*. The first fixing portion 13*a* does not overlap the first fixing portion 13*b*, the first fixing portion 13*c*, and the first fixing portion 13*d* as viewed in the Z axis direction. The first fixing portion 13*a* is not in contact with the first fixing portion 13*b*, the first fixing portion 13*c*, and the first fixing portion 13*d*.

A size of the first fixing portion 13*a* is smaller than a size of the holding member 10. Specifically, a length of the first fixing portion 13*a* in the second direction S is ⅕ or more and less than ½ of a length of the holding member 10 in the second direction S. In addition, a length of the first fixing portion 13*a* in the third direction T is ⅓ or more and less than ½ of a length of the holding member 10 in the third direction T.

The first fixing portion 13*b* is arranged at the second corner portion D2. The first fixing portion 13*b* overlaps the second corner portion D2 as viewed from the first direction F. In the present embodiment, an end of the first fixing portion 13*b* in the negative direction of the X axis overlaps the third side H3 as viewed in the Z axis direction. An end of the first fixing portion 13*b* in the positive direction of the Y axis overlaps the second side H2 as viewed in the Z axis direction. The first fixing portion 13*b* is separated from the first fixing portion 13*a*, the first fixing portion 13*c*, and the first fixing portion 13*d*. The first fixing portion 13*b* does not overlap the first fixing portion 13*a*, the first fixing portion 13*c*, and the first fixing portion 13*d* as viewed in the Z axis direction. The first fixing portion 13*b* is not in contact with the first fixing portion 13*a*, the first fixing portion 13*c*, and the first fixing portion 13*d*. The other configuration of the first fixing portion 13*b* is the same as that of the first fixing portion 13*a*, and thus the description thereof will be omitted.

The first fixing portion 13*c* is arranged at the third corner portion D3. The first fixing portion 13*c* overlaps the third corner portion D3 as viewed from the first direction F. In the present embodiment, an end of the first fixing portion 13*c* in the positive direction of the X axis overlaps the fourth side H4 as viewed in the Z axis direction. An end of first fixing portion 13*c* in the negative direction of the Y axis overlaps the first side H1 as viewed in the Z axis direction. The first fixing portion 13*c* is separated from the first fixing portion 13*a*, the first fixing portion 13*b*, and the first fixing portion 13*d*. The first fixing portion 13*c* does not overlap the first fixing portion 13*a*, the first fixing portion 13*b*, and the first fixing portion 13*d* as viewed in the Z axis direction. The first fixing portion 13*c* is not in contact with the first fixing portion 13*a*, the first fixing portion 13*b*, and the first fixing portion 13*d*. The other configuration of the first fixing portion 13*c* is the same as that of the first fixing portion 13*a*, and thus the description thereof will be omitted.

The first fixing portion 13*d* is arranged at the fourth corner portion D4. The first fixing portion 13*d* overlaps the fourth corner portion D4 as viewed from the first direction F. In the present embodiment, an end of the first fixing portion 13*d* in the positive direction of the X axis overlaps the fourth side H4 as viewed in the Z axis direction. An end of the first fixing portion 13*d* in the positive direction of the Y axis overlaps the second side H2 as viewed in the Z axis direction. The first fixing portion 13*d* is separated from the first fixing portion 13*a*, the first fixing portion 13*b*, and the first fixing portion 13*c*. The first fixing portion 13*d* does not overlap the first fixing portion 13*a*, the first fixing portion 13*b*, and the first fixing portion 13*c* as viewed in the Z axis direction. The first fixing portion 13*d* is not in contact with the first fixing portion 13*a*, the first fixing portion 13*b*, and the first fixing portion 13*c*. The other configuration of the first fixing portion 13*d* is the same as that of the first fixing portion 13*a*, and thus the description thereof will be omitted.

There is a gap between the holding member 10 and the housing 11 due to four first fixing portions 13*a*, 13*b*, 13*c*, and 13*d*. For example, there is a gap between the holding member 10 and the housing 11 between the first fixing portion 13*a* and the first fixing portion 13*b*. There is a gap between the holding member 10 and the housing 11 between the first fixing portion 13*a* and the first fixing portion 13*c*. There is a gap between the holding member 10 and the housing 11 between the first fixing portion 13*c* and the first fixing portion 13*d*. There is a gap between the holding member 10 and the housing 11 between the first fixing portion 13*b* and the first fixing portion 13*d*.

Advantageous Effect

In a terminal (hereinafter, referred to as a comparative example) described in Patent Document 1, the entire outer peripheral edge portion of the holding member is fixed to the housing. In this case, when the user presses the outer peripheral edge portion of the holding member in the negative direction of the Z axis, the holding member is less likely to be deformed so as to protrude in the negative direction of the Z axis. Therefore, in the comparative example, when the user presses the outer peripheral edge portion of the holding member, the piezoelectric sensor provided in the holding member is less likely to be deformed. As a result, in the comparative example, there is a possibility that the piezoelectric sensor cannot detect the deformation of the holding member.

On the other hand, the sensor 1 includes four first fixing portions 13*a*, 13*b*, 13*c*, and 13*d*. The four first fixing portions 13*a*, 13*b*, 13*c*, and 13*d* are arranged at four corner portions of the holding member 10, respectively. As a result, portions (hereinafter, referred to as contact portions) of the holding member 10 with which the four first fixing portions 13*a*, 13*b*, 13*c*, and 13*d* are in contact are fixed to the housing 11. At this time, for example, a portion of the holding member 10 located between the first fixing portion 13*a* and the first fixing portion 13*b* is not firmly fixed to the housing 11 as compared with the contact portion. Therefore, as compared with the contact portion, a portion of the holding member 10 located between the first fixing portion 13*a* and the first fixing portion 13*b* is likely to be deformed so as to protrude in the negative direction of the Z axis. Therefore, the deformation detection sensor 12 fixed to the holding member 10 is likely to be deformed. As a result, according to the sensor 1, the deformation detection sensor 12 can easily detect the deformation of the holding member 10.

For the same reason, the portion of the holding member 10 located between the first fixing portion 13*a* and the first fixing portion 13*c* is more likely to be deformed than the contact portion, so that the deformation detection sensor 12 can easily detect the deformation of the holding member 10. The portion of the holding member 10 located between the first fixing portion 13*b* and the first fixing portion 13*d* is more likely to be deformed than the contact portion, so that the deformation detection sensor 12 easily detects the deformation of the holding member 10. The portion of the holding member 10 located between the first fixing portion 13*c* and the first fixing portion 13*d* is more likely to be deformed than the contact portion, so that the deformation detection sensor 12 easily detects the deformation of the holding member 10.

In the sensor 1, there is a gap between the holding member 10 and the housing 11 due to four first fixing portions 13*a*, 13*b*, 13*c*, and 13*d* (the plurality of first fixing portions). For example, there is a gap between the holding member 10 and the housing 11 between the first fixing portion 13*a* and the first fixing portion 13*b*. Accordingly, when the user 200 presses a space between the first fixing portion 13*a* and the first fixing portion 13*b* (an outer peripheral edge portion of the holding member 10) of the holding member 10 in the negative direction of the Z axis, the holding member 10 is likely to be deformed so as to protrude in the negative direction of the Z axis. Therefore, the deformation detection sensor 12 fixed to the holding member 10 is likely to be deformed. As a result, according to the sensor 1, the deformation detection sensor 12 can easily detect the deformation of the holding member 10.

For the same reason, the holding member 10 is likely to be deformed between the first fixing portion 13*b* and the first fixing portion 13*d*, so that the deformation detection sensor 12 easily detects the deformation of the holding member 10. For the same reason, the holding member 10 is likely to be deformed between the first fixing portion 13*a* and the first fixing portion 13*b*, so that the deformation detection sensor 12 easily detects the deformation of the holding member 10. For the same reason, the holding member 10 is likely to be deformed between the first fixing portion 13*c* and the first fixing portion 13*d*, so that the deformation detection sensor 12 can easily detect the deformation of the holding member 10.

First Modification

Figure 5:
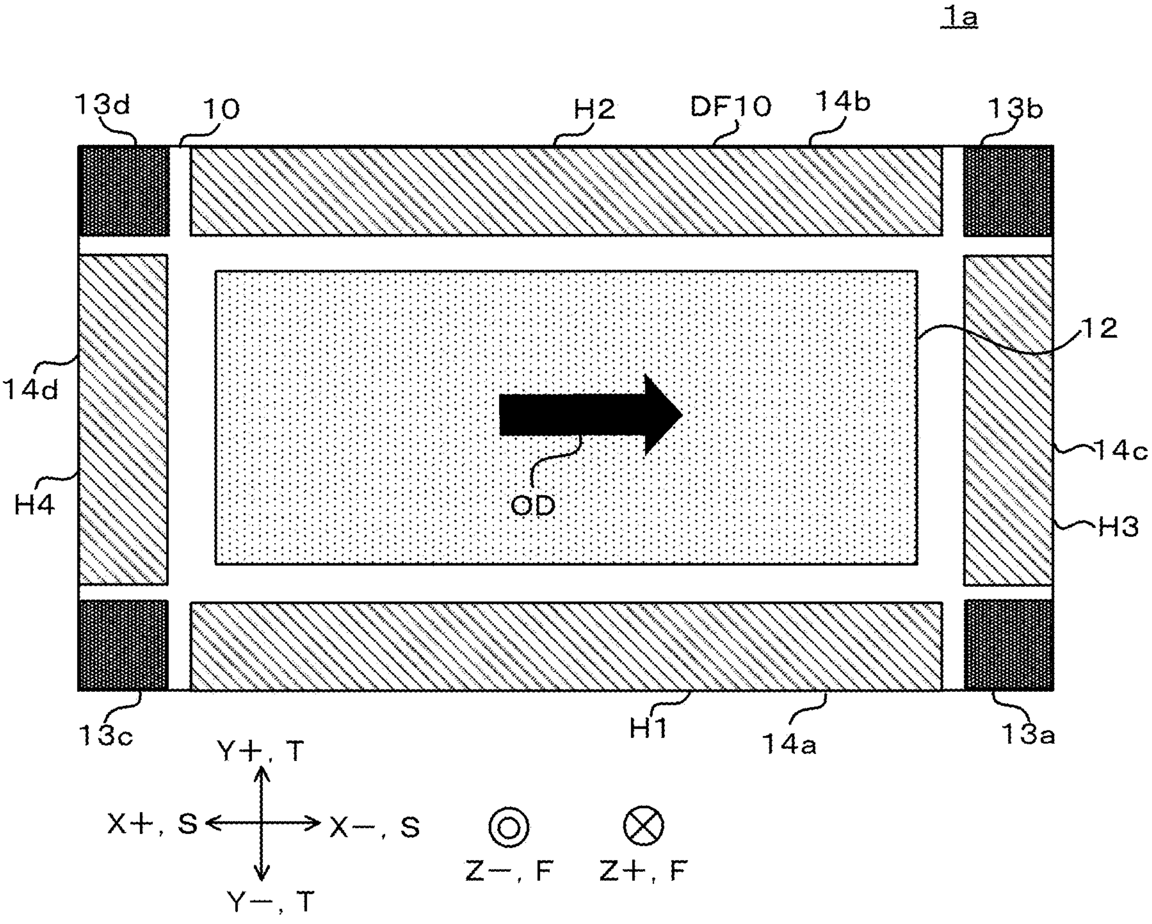
FIG. 5 is a view illustrating a sensor 1*a* according to a first modification.

Hereinafter, a sensor 1*a* according to a first modification will be described with reference to the drawings. FIG. 5 is a view illustrating the sensor 1*a* according to the first modification. FIG. 5 is a view of the holding member 10, four first fixing portions 13*a* to 13*d*, and four second fixing portions 14*a* to 14*d* as viewed in the positive direction of the Z axis.

The sensor 1*a* is different from the sensor 1 in that the sensor 1*a* further includes at least one second fixing portion. In the present modification, as illustrated in FIG. 5, the sensor 1*a* further includes four second fixing portions 14*a*, 14*b*, 14*c*, and 14*d*. Each of the four second fixing portions 14*a* to 14*d* are fixed to the second main surface DF10 of the holding member 10. Each of the four second fixing portions 14*a* to 14*d* overlaps the outer peripheral portion of the holding member 10 as viewed from the first direction F. The four second fixing portions 14*a* to 14*d* do not overlap each other as viewed in the Z axis direction. The four second fixing portions 14*a* to 14*d* are not in contact with each other. The four second fixing portions 14*a* to 14*d* do not overlap the four first fixing portions 13*a* to 13*d* (the plurality of first fixing portions) as viewed from the first direction F, respectively. Each of the four second fixing portions 14*a* to 14*d* does not overlap the deformation detection sensor 12. Each of the four second fixing portions 14*a* to 14*d* is, for example, a double-sided tape.

The second fixing portion 14*a* is located between the first fixing portion 13*a* and the first fixing portion 13*c* as viewed in the Z axis direction. The second fixing portion 14*a* overlaps the first side H1 as viewed in the Z axis direction. An end of the second fixing portion 14*a* in the negative direction of the Y axis overlaps the first side H1 as viewed in the Z axis direction.

The second fixing portion 14*a* is softer than the first fixing portion 13*a*. Specifically, an integrated value of the Young's modulus of the first fixing portion 13*a* and a thickness of the first fixing portion 13*a* in the first direction F is a first coefficient of the first fixing portion 13*a*. The integrated value of the Young's modulus of the second fixing portion 14*a* and a thickness of the second fixing portion 14*a* in the first direction F is a second coefficient of the second fixing portion 14*a*. At this time, the second coefficient of the second fixing portion 14*a* is smaller than the first coefficient of the first fixing portion 13*a*.

Similarly, the second fixing portion 14*a* is softer than the first fixing portions 13*b*, 13*c*, and 13*d*. Specifically, the second coefficient of the second fixing portion 14*a* is smaller than the first coefficient of the first fixing portion 13*b*. The second coefficient of the second fixing portion 14*a* is smaller than the first coefficient of the first fixing portion 13*c*. The second coefficient of the second fixing portion 14*a* is smaller than the first coefficient of the first fixing portion 13*d*.

The second fixing portion 14*b* is located between the first fixing portion 13*b* and the first fixing portion 13*d* as viewed in the Z axis direction. The second fixing portion 14*b* overlaps the second side H2 as viewed in the Z axis direction. An end of the second fixing portion 14*b* in the positive direction of the Y axis overlaps the second side H2 as viewed in the Z axis direction. Similarly to the second fixing portion 14*a*, the second coefficient of the second fixing portion 14*b* is smaller than the first coefficient of each of the first fixing portions 13*a* to 13*d*. The other configuration of the second fixing portion 14*b* is the same as the configuration of the second fixing portion 14*a*, and thus the description thereof will be omitted.

The second fixing portion 14*c* is located between the first fixing portion 13*a* and the first fixing portion 13*b* as viewed in the Z axis direction. The second fixing portion 14*c* overlaps the third side H3 as viewed in the Z axis direction. An end of the second fixing portion 14*c* in the negative direction of the X axis overlaps the third side H3 as viewed in the Z axis direction. Similarly to the second fixing portion 14*a*, the second coefficient of the second fixing portion 14*c* is smaller than the first coefficient of each of the first fixing portions 13*a* to 13*d*. The other configuration of the second fixing portion 14*c* is the same as the configuration of the second fixing portion 14*a*, and thus the description thereof will be omitted.

The second fixing portion 14*d* is located between the first fixing portion 13*c* and the first fixing portion 13*d* as viewed in the Z axis direction. The second fixing portion 14*d* overlaps the fourth side H4 as viewed in the Z axis direction. An end of the second fixing portion 14*d* in the positive direction of the X axis overlaps the fourth side H4 as viewed in the Z axis direction. Similarly to the second fixing portion 14*a*, the second coefficient of the second fixing portion 14*d* is smaller than the first coefficient of each of the first fixing portions 13*a* to 13*d*. The other configuration of the second fixing portion 14*d* is the same as the configuration of the second fixing portion 14*a*, and thus the description thereof will be omitted.

In the case of the above configuration, a largest second coefficient among the second coefficients of the plurality of second fixing portions 14*a* to 14*d* is smaller than a smallest first coefficient among the first coefficients of the plurality of first fixing portions 13*a* to 13*d*.

Advantageous Effect

As viewed in the Z axis direction, in addition to four first fixing portions 13*a* to 13*d*, four second fixing portions 14*a* to 14*d* are provided around the deformation detection sensor 12 in the sensor 1*a*. In this case, foreign matter such as liquid hardly enters the sensor 1*a* from an outside of the sensor 1*a*. Therefore, the deformation detection sensor 12 and electronic components, other than the deformation detection sensor 12, included in the sensor 1*a* are less likely to come into contact with foreign matter such as liquid. Therefore, the sensor 1*a* is less likely to fail.

For example, the second coefficient of the second fixing portion 14*a* is smaller than the first coefficient of the first fixing portion 13*a*. In this case, the portion of the holding member 10 where the second fixing portion 14*a* is arranged is likely to be deformed so as to protrude toward the negative direction of the Z axis, as compared with the portion of the holding member 10 where the first fixing portions 13*a*, 13*b*, and 13*c* are arranged. Therefore, the deformation detection sensor 12 provided in the holding member 10 easily detects the deformation of the holding member 10. For the same reason, the portion of the holding member 10 where the second fixing portions 14*b*, 14*c*, and 14*d* are provided is likely to be deformed, so that the deformation detection sensor 12 easily detects the deformation of the holding member 10.

Second Modification

Figure 6:
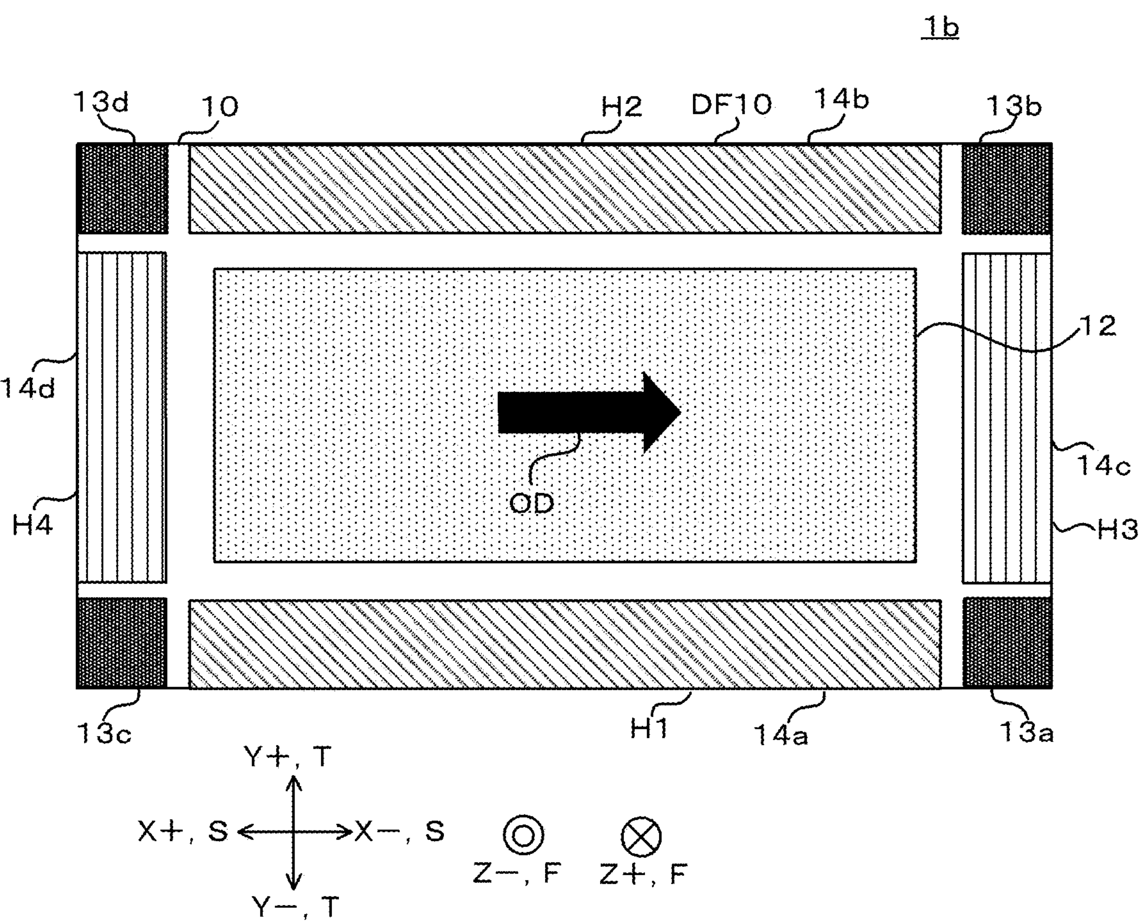
FIG. 6 is a view illustrating a sensor 1*b* according to a second modification.

Hereinafter, a sensor 1*b* according to a second modification will be described with reference to the drawings. FIG. 6 is a view illustrating the sensor 1*b* according to the second modification. FIG. 6 is a view of the holding member 10, the first fixing portions 13*a* to 13*d*, and the second fixing portions 14*a* to 14*d* as viewed in the positive direction of the Z axis.

A softness of the second fixing portion 14*c* in the sensor 1*b* is different from a softness of the second fixing portion 14*c* in the sensor 1*a*. Specifically, in the present modification, the second fixing portion 14*c* is softer than the second fixing portion 14*a*. More specifically, the second coefficient of the second fixing portion 14*c* is smaller than the second coefficient of the second fixing portion 14*a*. Similarly, the second coefficient of the second fixing portion 14*c* is smaller than the second coefficient of the second fixing portion 14*b*. The other configuration of the second fixing portion 14*c* in the sensor 1*b* is the same as the configuration of the second fixing portion 14*c* in the sensor 1*a*, and thus the description thereof will be omitted.

In addition, a softness of the second fixing portion 14*d* in the sensor 1*b* is different from a softness of the second fixing portion 14*d* in the sensor 1*a*. Specifically, in the present modification, the second fixing portion 14*d* is softer than the second fixing portion 14*a*. More specifically, the second coefficient of the second fixing portion 14*d* is smaller than the second coefficient of the second fixing portion 14*a*. Similarly, the second coefficient of the second fixing portion 14*d* is smaller than the second coefficient of the second fixing portion 14*b*. The other configuration of the second fixing portion 14*d* in the sensor 1*b* is the same as the configuration of the second fixing portion 14*d* in the sensor 1*a*, and thus the description thereof will be omitted.

In the case of the above configuration, the second coefficients of the second fixing portions 14*a* and 14*b*, which are arranged on the long sides of the holding member 10, among the plurality of second fixing portions 14*a* to 14*d* are larger than the second coefficients of the second fixing portions 14*c* and 14*d*, which are arranged on the short sides of the holding member 10, among the plurality of second fixing portions 14*a* to 14*d*.

Advantageous Effect

For example, a vicinity of the first side H1 which is a long side is more likely to be deformed than a vicinity of the third side H3 which is a short side. Here, the second fixing portion 14*c* arranged near the third side H3 is softer than the second fixing portion 14*a* arranged near the first side H1. In this case, the second fixing portion 14*a* which is less likely to be deformed is arranged near the first side H1 which is likely to be deformed. In addition, the second fixing portion 14*c* which is likely to be deformed is arranged near the third side H3 which is less likely to be deformed. As a result, in a case where a magnitude of a force when the vicinity of the first side H1 is pressed is the same as a magnitude of a force when the vicinity of the third side H3 is pressed, a deformation amount in the vicinity of the first side H1 is likely to be the same as a deformation amount in the vicinity of the third side H3. As a result, an arithmetic circuit or the like (not illustrated) that has received a signal output from the deformation detection sensor 12 can easily accurately specify a magnitude of the force applied to the holding member 10.

Third Modification

Figure 7:
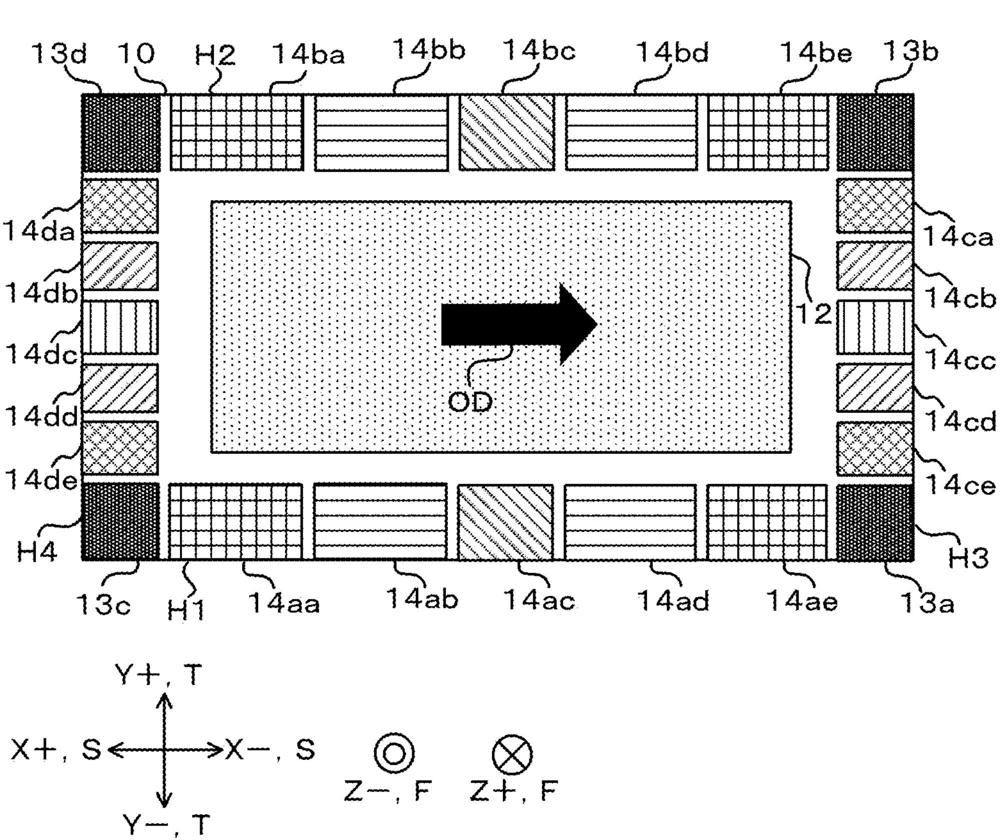
FIG. 7 is a view illustrating a sensor 1*c* according to a third modification.

Hereinafter, a sensor 1*c* according to a third modification will be described with reference to the drawings. FIG. 7 is a view illustrating the sensor 1*c* according to the third modification.

The sensor 1*c* is different from the sensor 1*b* in that the sensor 1*c* includes five or more second fixing portions 14*aa* to 14*ae*, 14*ba* to 14*be*, 14*ca* to 14*cd*, and 14*da* to 14*dd*.

The second fixing portions 14*aa* to 14*ae* are arranged at intervals in this order in the negative direction of the X axis. Ends of the second fixing portions 14*aa* to 14*ae* in the negative direction of the Y axis overlap the first side H1 as viewed in the Z axis direction.

In the present modification, the second coefficients of the second fixing portions 14*aa* to 14*ae* are preferably stepwise values corresponding to distances to the corner portion of the holding member 10. For example, the second coefficients of the second fixing portions 14*ab* and 14*ad* are preferably larger than the second coefficients of the second fixing portions 14*aa* and 14*ae*. The second coefficient of the second fixing portion 14*ac* is preferably larger than the second coefficients of the second fixing portions 14*ab* and 14*ad*.

Ends of the second fixing portions 14*ba* to 14*be* in the positive direction of the Y axis overlap the second side H2 as viewed in the Z axis direction. Similarly to the second fixing portions 14*aa* to 14*ae*, the second coefficients of the second fixing portions 14*ba* to 14*be* are preferably stepwise values corresponding to distances to the corner portion of the holding member 10. The other configurations of the second fixing portions 14*ba* to 14*be* are the same as the configurations of the second fixing portions 14*aa* to 14*ae*, and thus the description thereof will be omitted.

The second fixing portions 14*ca* to 14*ce* are arranged at intervals in this order in the negative direction of the Y axis. Similarly to the second fixing portions 14*aa* to 14*ae*, the second coefficients of the second fixing portions 14*ca* to 14*ce* are stepwise values corresponding to distances to the corner portion of the holding member 10. Ends of the second fixing portions 14*ca* to 14*ce* in the negative direction of the X axis overlap the third side H3 as viewed in the Z axis direction.

Ends of the second fixing portions 14*da* to 14*de* in the positive direction of the X axis overlap the fourth side H4 as viewed in the Z axis direction. Similarly to the second fixing portions 14*aa* to 14*ae*, the second coefficients of the second fixing portions 14*da* to 14*de* are preferably stepwise values corresponding to distances from the corner portion of the holding member 10. The other configurations of the second fixing portions 14*da* to 14*de* are the same as the configurations of the second fixing portions 14*ca* to 14*ce*, and thus the description thereof will be omitted.

As described above, in the present modification, the plurality of second fixing portions are provided on each side of the holding member 10. In this case, the second coefficient is calculated on the basis of an average value of the thicknesses of the plurality of second fixing portions provided on each side of the holding member 10. For example, the average value of the thicknesses of the plurality of second fixing portions 14*aa* to 14*ae* provided on the first side H1 is defined as the thickness of the second fixing portion on the first side H1. Then, an average value obtained by dividing the second coefficients of the plurality of second fixing portions 14*aa* to 14*ae* by the number of the plurality of second fixing portions arranged on the first side H1 is defined as the second coefficient of the second fixing portion on the first side H1. At this time, the second coefficient of the second fixing portion on the first side H1 (the long side of the holding member 10) is larger than the second coefficient of the second fixing portion on the third side H3 (the short side of the holding member 10) or the second coefficient of the second fixing portion on the fourth side H4 (the short side of the holding member 10). Similarly, the second coefficient of the second fixing portion on the second side H2 is larger than the second coefficient of the second fixing portion on the third side H3 or the second coefficient of the second fixing portion on the fourth side H4.

Advantageous Effect

A vicinity of a center of the first side H1 is more likely to be deformed than vicinities of both ends of the first side H1. Here, the second coefficient of each of the second fixing portions 14*ab* and 14*ad* is larger than the second coefficient of each of the second fixing portions 14*aa* and 14*ae*. The second coefficient of the second fixing portion 14*ac* is larger than the second coefficient of each of the second fixing portions 14*ab* and 14*ad*. In this case, the second fixing portion 14*ac* which is less likely to be deformed is arranged near the center of the first side H1 which is likely to be deformed. In addition, the second fixing portions 14*aa* and 14*ae* which are likely to be deformed are arranged near both ends of the first side H1 which are less likely to be deformed. As a result, in a case where the magnitude of the force when the vicinity of the center of the first side H1 is pressed is the same as a magnitude of a force when each vicinity of both ends of the first side H1 is pressed, a deformation amount in the vicinity of the center of the first side H1 is likely to be the same as a deformation amount in each vicinity of both ends of the first side H1. As a result, an arithmetic circuit or the like (not illustrated) that has received a signal output from the deformation detection sensor 12 can easily accurately specify a magnitude of the force applied to the holding member 10.

For the same reason, the arithmetic circuit can easily accurately specify the magnitude of the force applied to the holding member 10, by the second fixing portions 14*ba* to 14*be* having different degrees of softness, the second fixing portions 14*ca* to 14*ce* having different degrees of softness, or the second fixing portions 14*da* to 14*de* having different degrees of softness.

Fourth Modification

Figure 8:
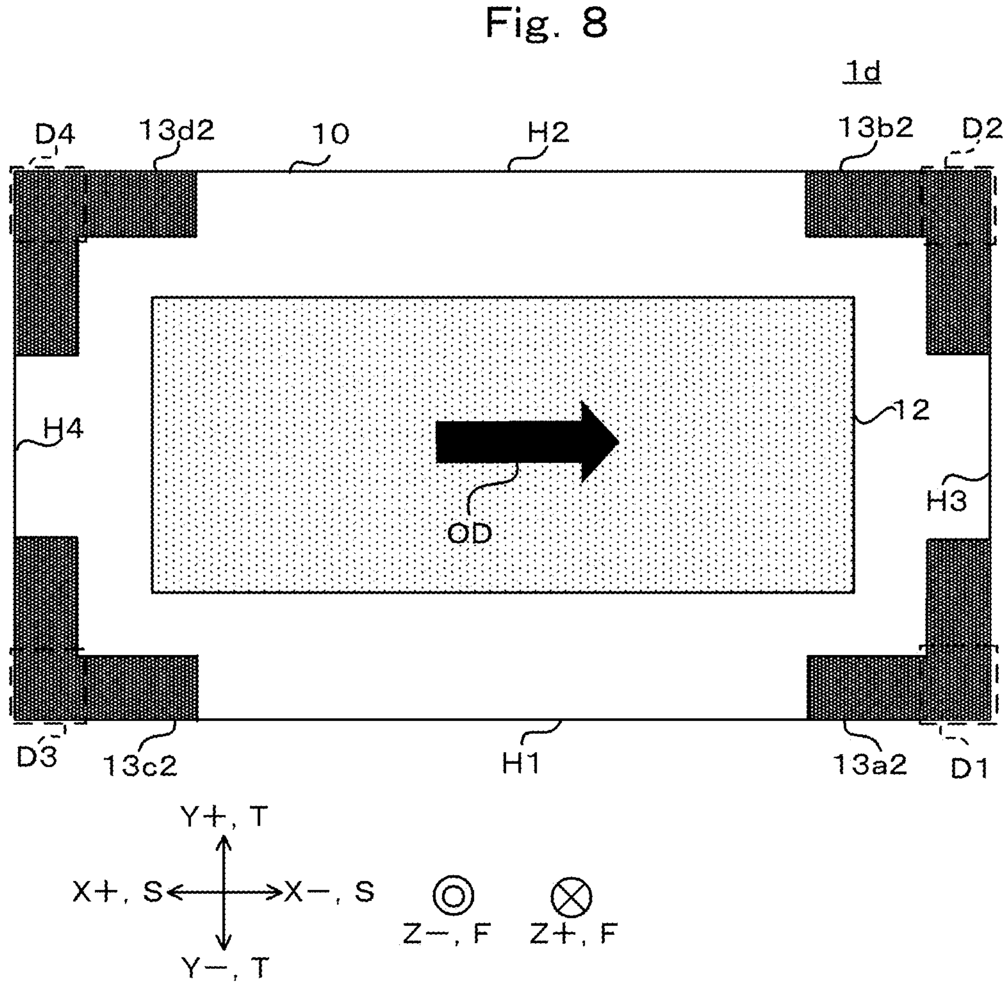
FIG. 8 is a view illustrating a sensor 1*d* according to a fourth modification.

Hereinafter, a sensor 1*d* according to a fourth modification will be described with reference to the drawings. FIG. 8 is a view illustrating the sensor 1*d* according to the fourth modification.

As illustrated in FIG. 8, the sensor 1*d* is different from the sensor 1 in that the sensor 1*d* includes first fixing portions 13*a*2, 13*b*2, 13*c*2, and 13*d*2 different in shape from the first fixing portions 13*a*, 13*b*, 13*c*, and 13*d* instead of the first fixing portions 13*a*, 13*b*, 13*c*, and 13*d*. Each of the first fixing portions 13*a*2, 13*b*2, 13*c*2, and 13*d*2 has an L shape as viewed in the first direction F.

As illustrated in FIG. 8, a part of the first fixing portion 13*a*2 extends from the first corner portion D1 toward the positive direction of the X axis. A part of the first fixing portion 13*a*2 extends from the first corner portion D1 toward the positive direction of the Y axis. A part of the first fixing portion 13*b*2 extends from the second corner portion D2 toward the positive direction of the X axis. A part of the first fixing portion 13*b*2 extends from the second corner portion D2 toward the negative direction of the Y axis. A part of the first fixing portion 13*c*2 extends from the third corner portion D3 toward the negative direction of the X axis. A part of the first fixing portion 13*c*2 extends from the third corner portion D3 toward the positive direction of the Y axis. A part of the first fixing portion 13*d*2 extends from the fourth corner portion D4 toward the negative direction of the X axis. A part of the first fixing portion 13*d*2 extends from the fourth corner portion D4 toward the negative direction of the Y axis.

Advantageous Effect

For example, the first fixing portion 13*a*2 has an L shape as viewed in the Z axis direction. In this case, an area of the portion of the sensor 1*d* where the first fixing portion 13*a*2 is in contact with the holding member 10 is larger than an area of the portion of the sensor 1 where the first fixing portion 13*a* is in contact with the holding member 10. Therefore, the holding member 10 is easily fixed to the housing 11. For the same reason, the holding member 10 is easily fixed to the housing 11 by the first fixing portions 13*b*2, 13*c*2, and 13*d*2.

As viewed in the Z axis direction, the deformation detection sensor 12 is surrounded by the L-shaped first fixing portions 13*a*2, 13*b*2, 13*c*2, and 13*d*2. In this case, a distance between the portion pressed by the user 200 in the holding member 10 and the portion provided with 13*a*2, 13*b*2, 13*c*2, 13*d*2 in the holding member 10 is likely to be constant. Therefore, in a case where the force with which the holding member 10 is pressed by the user 200 is constant, a deformation amount of the holding member 10 is likely to be constant regardless of a position where the holding member 10 is pressed by the user 200. As a result, the arithmetic circuit or the like (not illustrated) that has received the signal output from the deformation detection sensor 12 can easily accurately specify the magnitude of the force applied to the holding member 10. In addition, the sensor 1*d* has an effect similar to that of the sensor 1.

Fifth Modification

Figure 9:
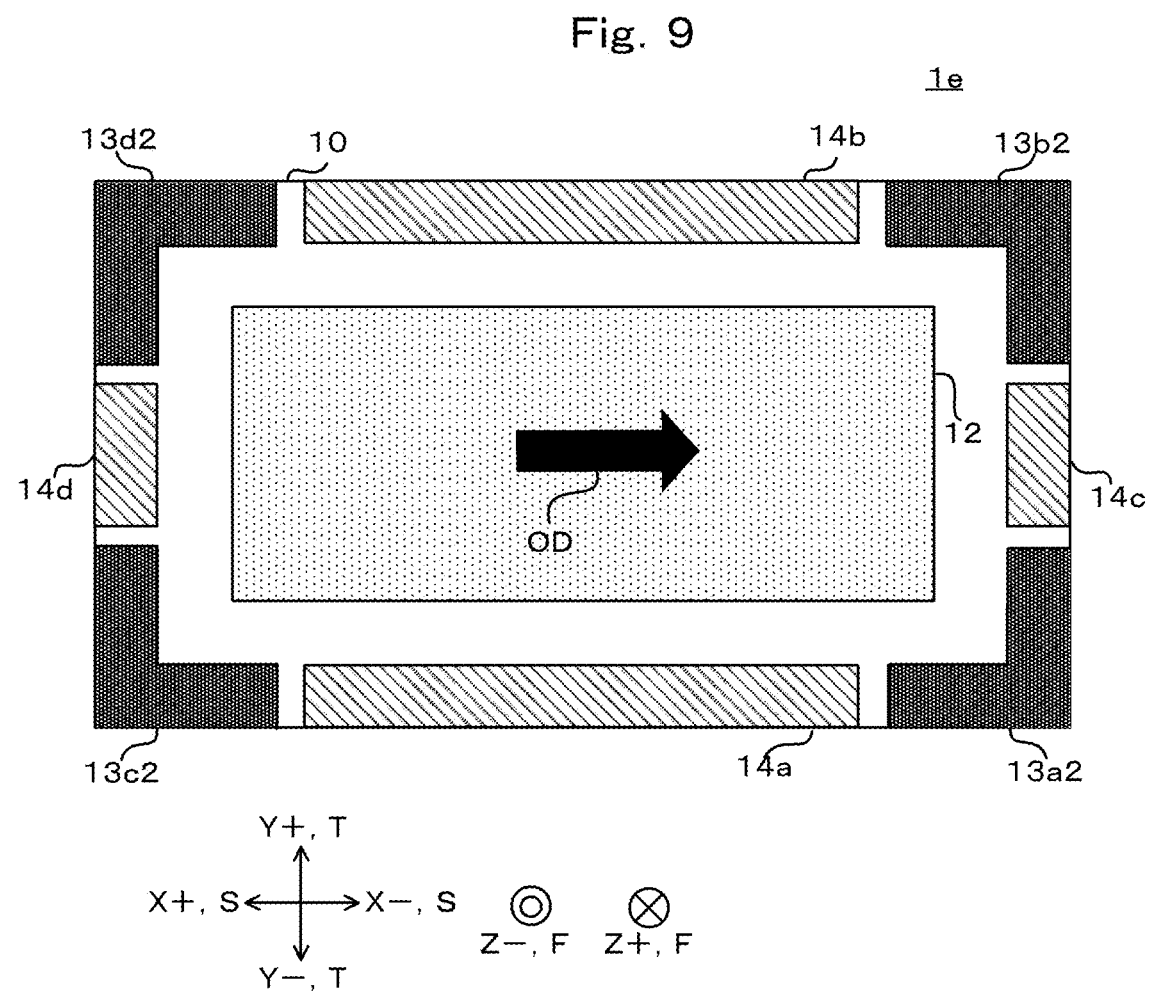

Hereinafter, a sensor 1*e* according to a fifth modification will be described with reference to the drawings. FIG. 9 is a view illustrating the sensor 1*e* according to the fifth modification.

As illustrated in FIG. 9, the sensor 1*e* is different from the sensor 1*d* in that the sensor 1*e* includes the second fixing portions 14*a* to 14*d*. The configurations of the second fixing portions 14*a* to 14*d* in the sensor 1*e* are the same as the configurations of the second fixing portions 14*a* to 14*d* in the sensor 1*a*. The sensor 1*e* has an effect similar to that of the sensor 1*a* and an effect similar to that of the sensor 1*d*.

[First Modification of Electronic Device EE]

Figure 10:
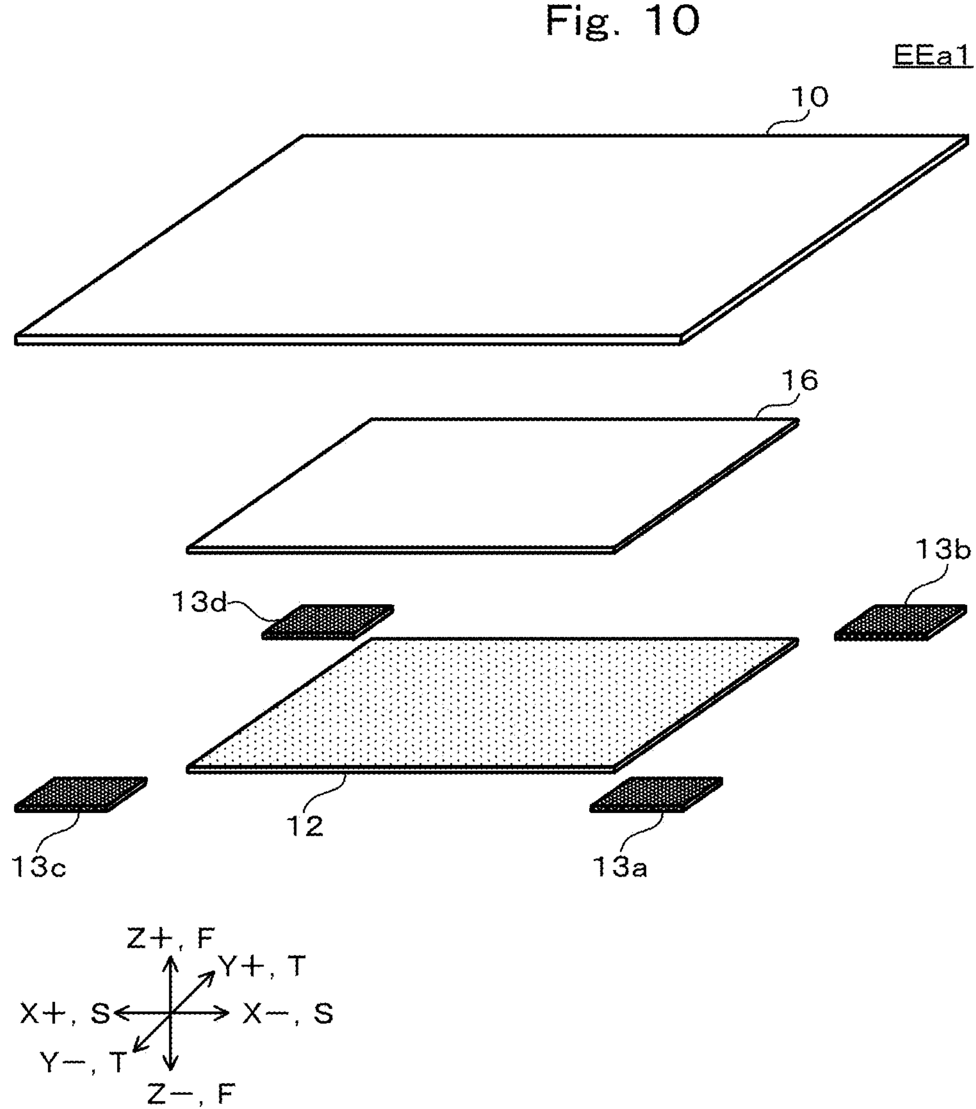
FIG. 10 is an exploded perspective view of an electronic device EEa1.
Figure 11:
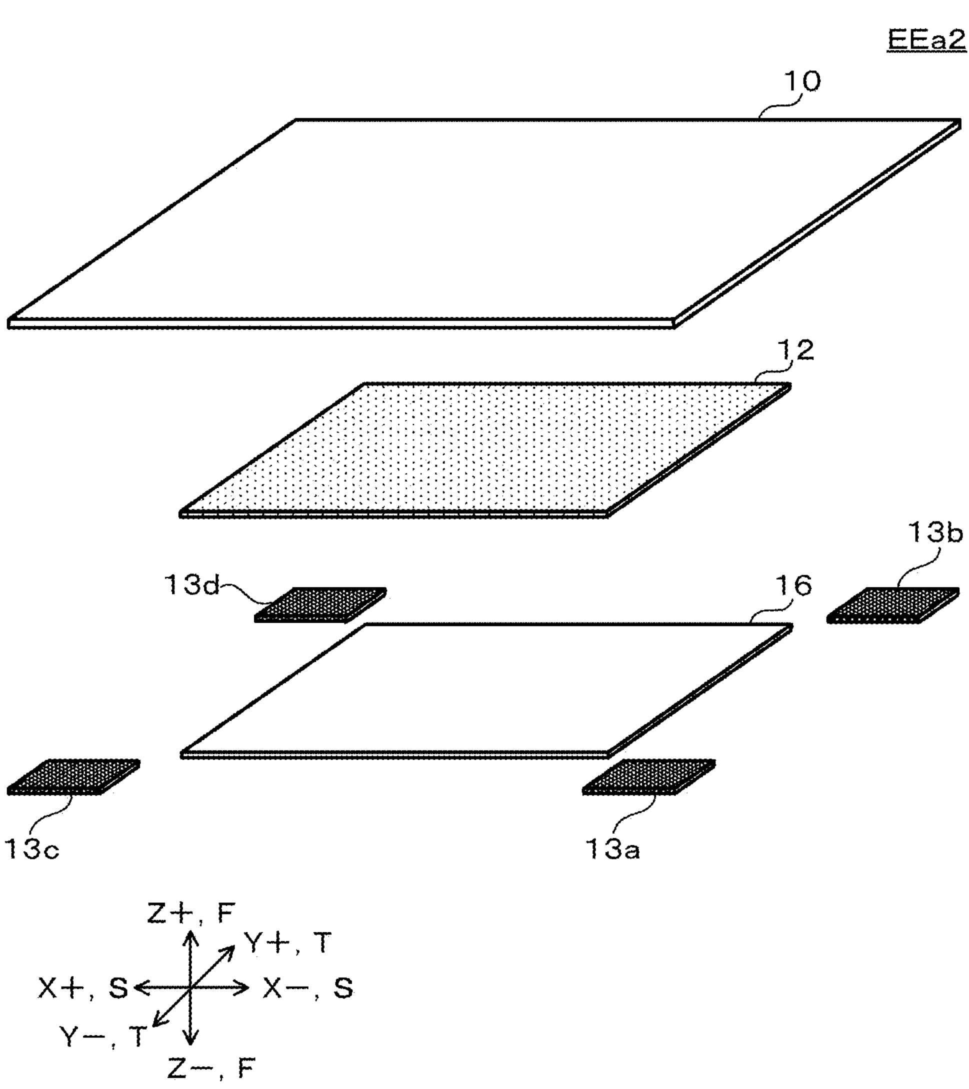
FIG. 11 is an exploded perspective view of an electronic device EEa2.

Hereinafter, electronic devices EEa1 and EEa2 according to a first modification of the electronic device EE will be described with reference to the drawings. FIG. 10 is an exploded perspective view of the electronic device EEa1. FIG. 11 is an exploded perspective view of the electronic device EEa2. In FIGS. 10 and 11, illustration of the housing 11 is omitted.

The electronic device EEa1 includes the sensor 1 and a touch panel 16. As illustrated in FIG. 10, the touch panel 16 is located between the holding member 10 and the deformation detection sensor 12 in the Z axis direction. The touch panel 16 is, for example, a capacitive touch panel. The touch panel 16 specifies a position pressed by the user 200 on the holding member 10. The electronic device EEa1 can specify the position where the user 200 presses the holding member 10 in addition to information such as the deformation amount of the holding member 10.

As illustrated in FIG. 11, the electronic device EEa2 is different from the electronic device EEa1 in that the touch panel 16, the deformation detection sensor 12, and the holding member 10 are arranged in this order in the positive direction of the Z axis. The electronic device EEa2 has an effect similar to that of the electronic device EEa1.

[Second Modification of Electronic Device EE]

Figure 12:
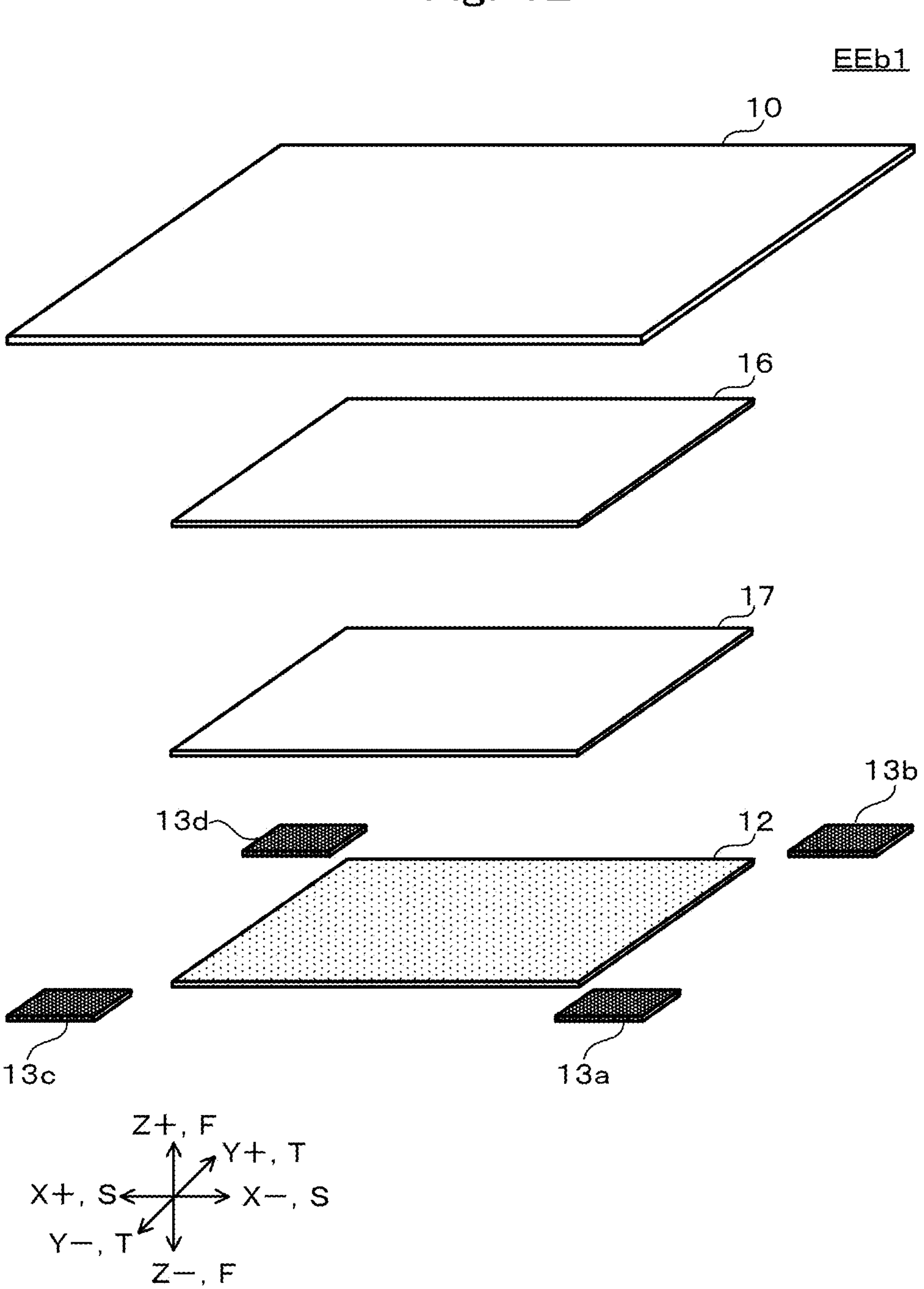
FIG. 12 is an exploded perspective view of an electronic device EEb1.
Figure 13:
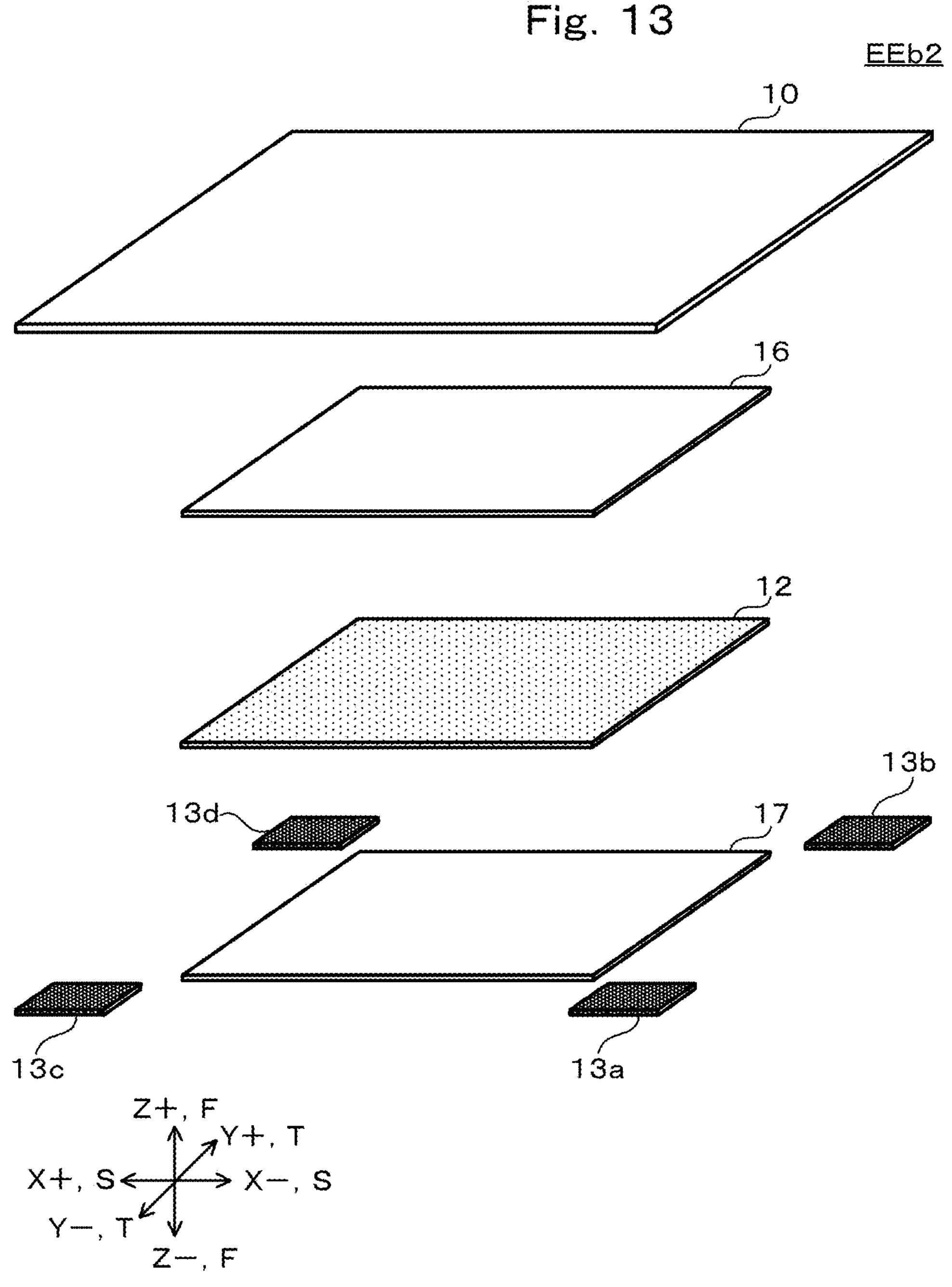
FIG. 13 is an exploded perspective view of an electronic device EEb2.

Hereinafter, electronic devices EEb1 and EEb2 according to a second modification of the electronic device EE will be described with reference to the drawings. FIG. 12 is an exploded perspective view of the electronic device EEb1. FIG. 13 is an exploded perspective view of the electronic device EEb2. In FIGS. 12 and 13, illustration of the housing 11 is omitted.

As illustrated in FIG. 12, the electronic device EEb1 is different from the electronic device EEa1 in that the electronic device EEb1 further includes a display 17. The display 17 is located between the deformation detection sensor 12 and the touch panel 16 in the Z axis direction. The display 17 is an organic EL display, a liquid crystal display, or the like. According to the electronic device EEb1, the user 200 can view information displayed on the display 17. In addition, the electronic device EEb1 has an effect similar to that of the electronic device EEa1.

As illustrated in FIG. 13, the electronic device EEb2 is different from the electronic device EEb1 in that the display 17, the deformation detection sensor 12, the touch panel 16, and the holding member 10 are arranged in this order in the positive direction of the Z axis. The electronic device EEb2 has an effect similar to that of the electronic device EEb1.

Other Embodiments

The sensor and the electronic device according to the present disclosure are not limited to the sensors 1 and 1*a* to 1*e* and the electronic devices EE and EEa1 to EEb2, and can be changed within the scope of the gist thereof. The configurations of the sensors 1 and 1*a* to 1*e* and the electronic devices EE and EEa1 to EEb2 may be arbitrarily combined.

Note that the holding member 10 may have a square shape as viewed in the first direction F.

Note that the X axis direction, the Y axis direction, and the Z axis direction are directions defined for description. Therefore, the X axis direction, the Y axis direction, and the Z axis direction at the time of actual use of the sensors 1 and 1*a* to 1*e* and the electronic devices EE and EEa1 to EEb2 do not necessarily have to coincide with the X axis direction, the Y axis direction, and the Z axis direction in each embodiment and each modification. For example, the long side of the holding member 10 may extend along the Y axis, or the short side of the holding member 10 may extend along the X axis.

Note that the first direction F, the second direction S, and the third direction T are directions defined for description. Therefore, the first direction F, the second direction S, and the third direction T at the time of actual use of the sensors 1 and 1*a* to 1*e* and the electronic devices EE and EEa1 to EEb2 do not necessarily have to coincide with the first direction F, the second direction S, and the third direction T in each embodiment and each modification.

Note that each of the first fixing portions 13*a* to 13*d* does not necessarily have to be a double-sided tape. Note that each of the second fixing portions 14*a* to 14*d* does not necessarily have to be a double-sided tape. Note that each of the second fixing portions 14*aa* to 14*ae* and each of the second fixing portions 14*ba* to 14*be* does not necessarily have to be a double-sided tape. Note that each of second fixing portions 14*ca* to 14*cd* does not necessarily have to be a double-sided tape. Note that each of second fixing portions 14*da* to 14*de* does not necessarily have to be a double-sided tape.

Note that the sensor 1*c* may include 21 or more second fixing portions. Note that the sensor 1*c* may include 5 or more and 19 or less second fixing portions.

Note that the electronic devices EEa1, EEa2, EEb1, and EEb2 may include any of the sensors 1*a* to 1*e* instead of the sensor 1.

Note that the first electrode 120 does not necessarily have to be a reference electrode, and the second electrode 122 does not necessarily have to be a signal electrode. For example, in the sensor 1, 1*a* to 1*e*, the first electrode 120 may be a signal electrode, and the second electrode 122 may be a reference electrode.

Note that the sensor 1, 1*a* to 1*e* does not necessarily have to include the housing 11. For example, the housing 11 may be one of components of the electronic devices EEa1, EEa2, EEb1, and EEb2.

Note that the configuration of the housing 11 is not limited only to the example described in the first embodiment and FIG. 1. For example, the housing 11 may produce the frame-shaped portion 111 by cutting a plate having a planar shape.

Note that in the first modification, the sensor 1*a* does not necessarily have to include four second fixing portions 14*a* to 14*d*. The sensor 1*a* may include at least one of the four second fixing portions 14*a* to 14*d*.

Note that in the first modification, the sensor 1*a* does not necessarily have to include four second fixing portions 14*a* to 14*d*. For example, the sensor 1*a* may include only two second fixing portions among the four second fixing portions 14*a* to 14*d*. For example, the sensor 1*a* may include only the second fixing portion 14*a* and the second fixing portion 14*b*, or may include only the second fixing portion 14*c* and the second fixing portion 14*d*.

Note that in the first modification, the values of the second coefficients of the second fixing portions 14*a* to 14*d* do not necessarily have to coincide with each other.

The present disclosure has the following structures.

(1) A sensor including: a holding member having a first main surface and a second main surface arranged in a first direction and having a rectangular shape as viewed from the first direction; a deformation detection sensor constructed to output a signal when the holding member is deformed; and a plurality of first fixing portions fixed to the second main surface and overlap corner portions of the holding member as viewed from the first direction, in which the plurality of first fixing portions are separated from each other.

(2) The sensor according to (1), further including: at least one second fixing portion fixed to the second main surface), in which the at least one second fixing portion overlaps an outer peripheral portion of the holding member as viewed from the first direction, and does not overlap the plurality of first fixing portions as viewed from the first direction.

(3) The sensor according to (2), in which in each of the first fixing portions, an integrated value of a Young's modulus and a thickness thereof is a first coefficient, in each of the second fixing portions, an integrated value of the Young's modulus and a thickness thereof is a second coefficient, and a largest second coefficient among the second coefficients of the at least one second fixing portion is smaller than a smallest first coefficient among the first coefficients of the plurality of first fixing portions.

(4) The sensor according to (3), in which the second coefficient of a second fixing portion arranged on a long side of the holding member among the at least one second fixing portion is larger than the second coefficient of a second fixing portion arranged on a short side of the holding member among the at least one second fixing portion.

(5) The sensor according to any one of (1) to (4), in which the plurality of first fixing portions is four first fixing portions, and the four first fixing portions each overlap a respective corner portion of the corner portions of the holding member as viewed from the first direction.

(6) The sensor module according to any one of (1) to (5), in which the holding member has a rectangular shape having two long sides extending in a second direction and two short sides extending in a third direction, a length of each of the plurality of first fixing portions in the second direction is ⅕ or more and less than ½ of a length of the holding member in the second direction, and a length of each of the plurality of first fixing portions in the third direction is ⅓ or more and less than ½ of a length of the holding member in the third direction.

(7) The sensor module according to any one of (1) to (6), in which each of the plurality of first fixing portions has an L shape as viewed in the first direction.

(8) The sensor module according to any one of (1) to (7), in which each of the plurality of first fixing portions is a double-sided tape.

(9) The sensor according to any one of (1) to (8), further including: a housing, in which each of the plurality of first fixing portions is fixed to the housing, and each of the plurality of first fixing portions is between the holding member and the housing in the first direction.

(10) An electronic device including: the sensor according to any one of (1) to (9); and a touch panel.

(11) The electronic device according to (10), in which the electronic device further includes a display.

DESCRIPTION OF REFERENCE SYMBOLS

1, 1*a* to 1*e*: Sensor
10: Holding member
11: Housing
12: Deformation detection sensor
13*a* to 13*d*: First fixing portions
D1: First corner portion
D2: Second corner portion
D3: Third corner portion
D4: Fourth corner portion
SF1: First main surface
SF2: Second main surface
F: First direction
S: Second direction
T: Third direction
EE, EEa1 to EEb2: Electronic device

The invention claimed is:

1. A sensor comprising:

a holding member having a first main surface and a second main surface arranged in a first direction and having a rectangular shape as viewed from the first direction;

a deformation detection sensor constructed to output a signal when the holding member is deformed; and a plurality of first fixing portions fixed to the second main surface and overlapping corner portions of the holding member as viewed from the first direction, wherein the plurality of first fixing portions are separated from each other and do not overlap the deformation detection sensor as view from the first direction.

2. The sensor according to claim 1, further comprising:
at least one second fixing portion fixed to the second main surface, wherein
the at least one second fixing portion overlaps an outer peripheral portion of the holding member as viewed from the first direction, and does not overlap the plurality of first fixing portions as viewed from the first direction.

3. The sensor according to claim 2, wherein
in each of the first fixing portions, an integrated value of a Young's modulus and a thickness thereof is a first coefficient,
in each of the second fixing portions, an integrated value of the Young's modulus and a thickness thereof is a second coefficient, and
a largest second coefficient among the second coefficients of the at least one second fixing portion is smaller than a smallest first coefficient among the first coefficients of the plurality of first fixing portions.

4. A sensor according to claim 3, comprising:
a holding member having a first main surface and a second main surface arranged in a first direction and having a rectangular shape as viewed from the first direction;
a deformation detection sensor constructed to output a signal when the holding member is deformed;
a plurality of first fixing portions fixed to the second main surface and overlapping corner portions of the holding member as viewed from the first direction; and
at least one second fixing portion fixed to the second main surface,
wherein the plurality of first fixing portions are separated from each other,
wherein the at least one second fixing portion overlaps an outer peripheral portion of the holding member as viewed from the first direction, and does not overlap the plurality of first fixing portions as viewed from the first direction,
wherein:
in each of the first fixing portions, an integrated value of a Young's modulus and a thickness thereof is a first coefficient,
in each of the second fixing portions, an integrated value of the Young's modulus and a thickness thereof is a second coefficient, and
a largest second coefficient among the second coefficients of the at least one second fixing portion is smaller than a smallest first coefficient among the first coefficients of the plurality of first fixing portions, and
wherein the second coefficient of a second fixing portion arranged on a long side of the holding member among the at least one second fixing portion is larger than the second coefficient of a second fixing portion arranged on a short side of the holding member among the at least one second fixing portion.

5. The sensor according to claim 3, wherein the at least one second fixing portion includes five or more portions arranged at intervals.

6. The sensor according to claim 5, wherein the second coefficients of the five or more portions are stepwise values corresponding to distances to a corner portion of the corner portions of the holding member.

7. The sensor according to claim 1, wherein
the plurality of first fixing portions is four first fixing portions, and
the four first fixing portions each overlap a respective corner portion of the corner portions of the holding member as viewed from the first direction.

8. The sensor according to claim 1, wherein
the holding member has a rectangular shape having two long sides extending in a second direction and two short sides extending in a third direction,
a length of each of the plurality of first fixing portions in the second direction is ⅕ or more and less than ½ of a length of the holding member in the second direction, and
a length of each of the plurality of first fixing portions in the third direction is ⅓ or more and less than ½ of a length of the holding member in the third direction.

9. The sensor according to claim 1, wherein each of the plurality of first fixing portions has an L shape as viewed in the first direction.

10. The sensor according to claim 9, further comprising:
at least one second fixing portion fixed to the second main surface, wherein
the at least one second fixing portion overlaps an outer peripheral portion of the holding member as viewed from the first direction, and does not overlap the plurality of first fixing portions as viewed from the first direction.

11. The sensor according to claim 10, wherein
in each of the first fixing portions, an integrated value of a Young's modulus and a thickness thereof is a first coefficient,
in each of the second fixing portions, an integrated value of the Young's modulus and a thickness thereof is a second coefficient, and
a largest second coefficient among the second coefficients of the at least one second fixing portion is smaller than a smallest first coefficient among the first coefficients of the plurality of first fixing portions.

12. A sensor comprising:
a holding member having a first main surface and a second main surface arranged in a first direction and having a rectangular shape as viewed from the first direction;
a deformation detection sensor constructed to output a signal when the holding member is deformed;
a plurality of first fixing portions fixed to the second main surface and overlapping corner portions of the holding member as viewed from the first direction, wherein
the plurality of first fixing portions are separated from each other; and
at least one second fixing portion fixed to the second main surface,
wherein the at least one second fixing portion overlaps an outer peripheral portion of the holding member as viewed from the first direction, and does not overlap the plurality of first fixing portions as viewed from the first direction,
wherein each of the plurality of first fixing portions has an L shape as viewed in the first direction,
wherein:
in each of the first fixing portions, an integrated value of a Young's modulus and a thickness thereof is a first coefficient,
in each of the second fixing portions, an integrated value of the Young's modulus and a thickness thereof is a second coefficient, and
a largest second coefficient among the second coefficients of the at least one second fixing portion is smaller than a smallest first coefficient among the first coefficients of the plurality of first fixing portions, and wherein the second coefficient of a second fixing portion arranged on a long side of the holding member among the at least one second fixing portion is larger than the second coefficient of a second fixing portion arranged on a short side of the holding member among the at least one second fixing portion.

13. The sensor according to claim 1, wherein each of the plurality of first fixing portions is a double-sided tape.

14. The sensor according to claim 1, further comprising:

a housing, wherein each of the plurality of first fixing portions is fixed to the housing, and each of the plurality of first fixing portions is between the holding member and the housing in the first direction.

15. An electronic device comprising:

the sensor according to claim 1; and a touch panel.

16. The electronic device according to claim 15, wherein the electronic device further includes a display.

* * * * *